United States Patent Office 3,380,475
Patented Apr. 30, 1968

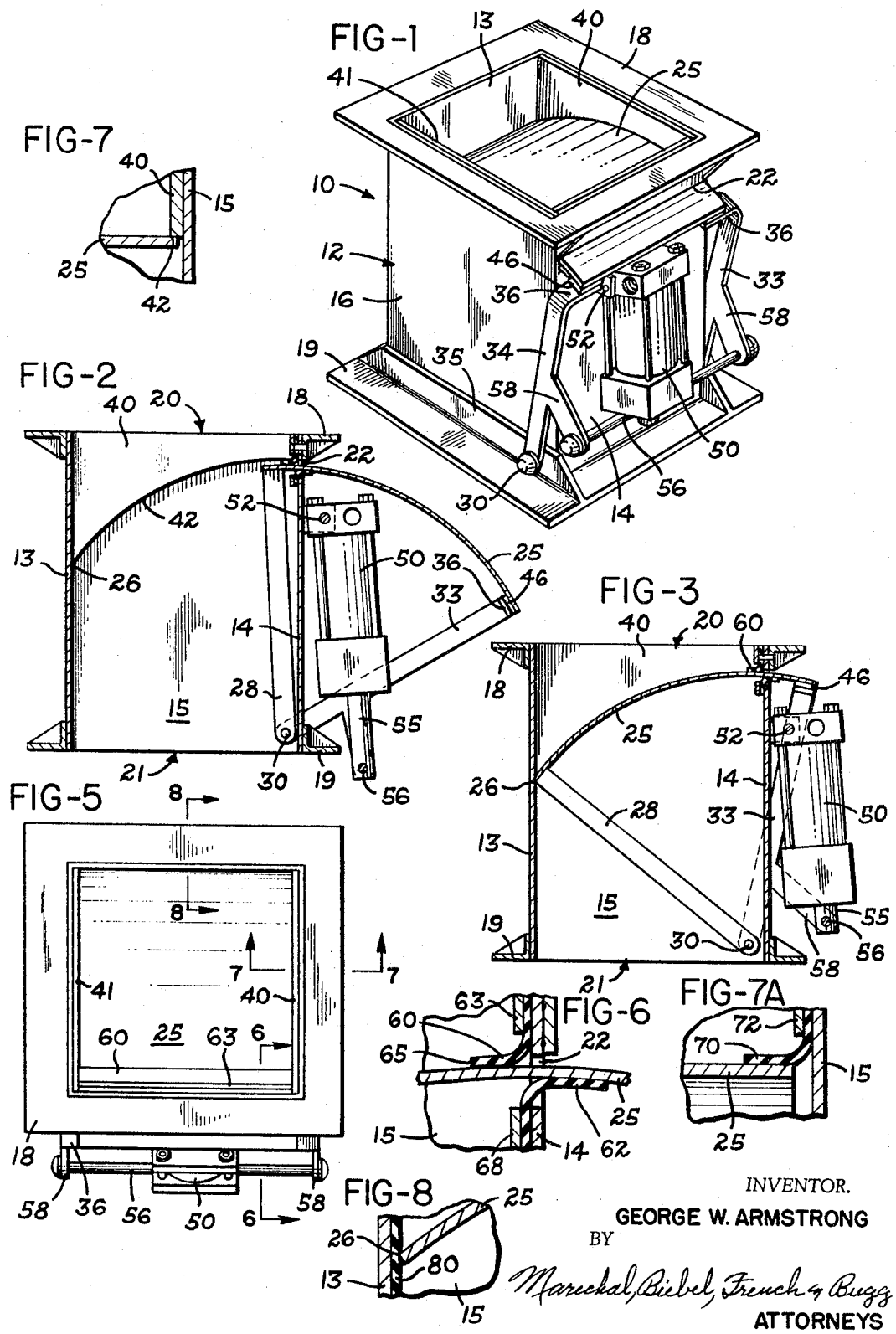

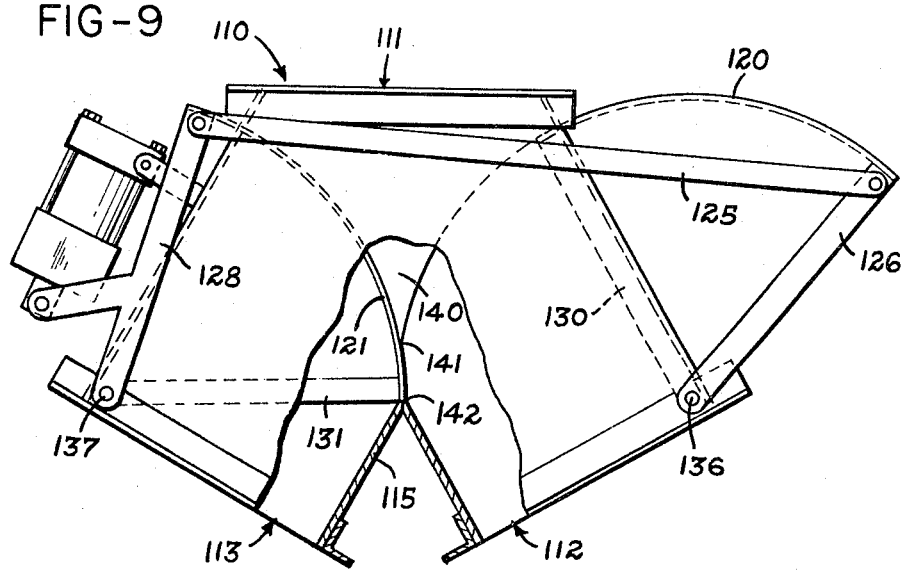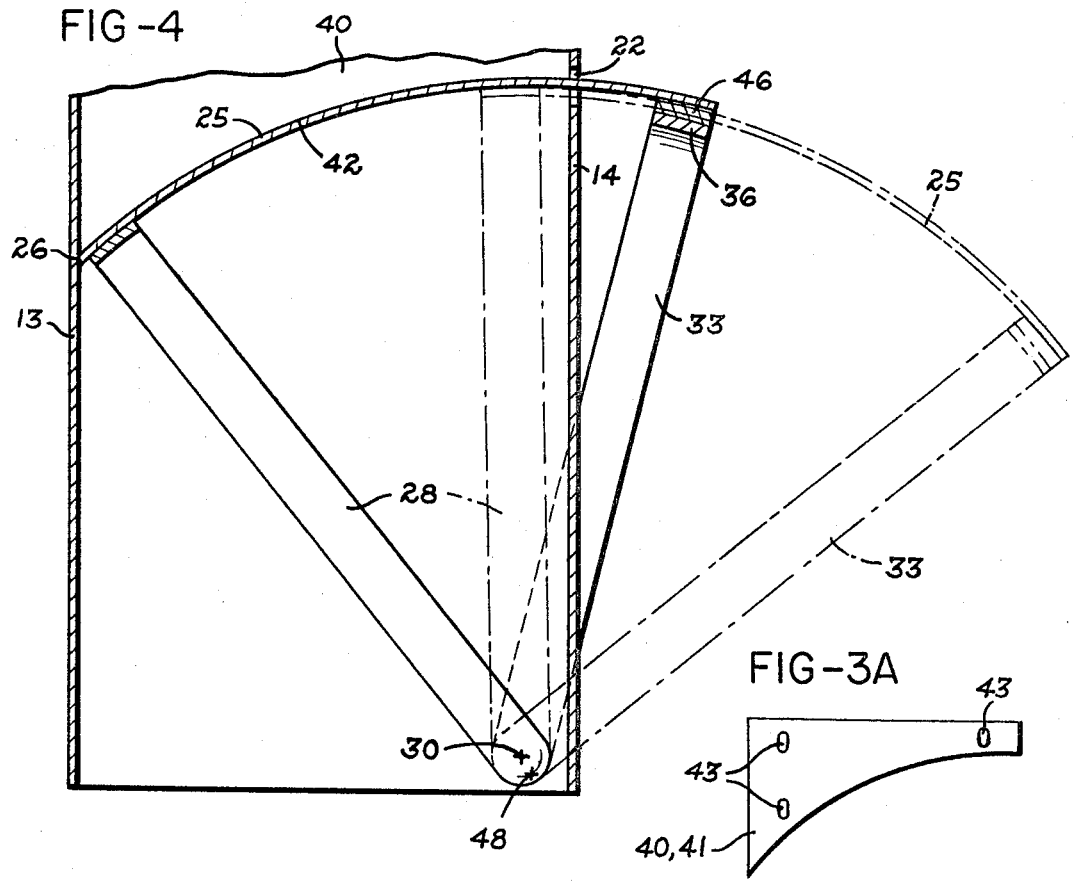

3,380,475
GATE VALVE
George W. Armstrong, c/o O. B. Armstrong & Son,
284 Dayton Drive, Fairborn, Ohio 45324
Filed June 24, 1965, Ser. No. 466,718
18 Claims. (Cl. 137—609)

ABSTRACT OF THE DISCLOSURE

Blade type gate valves are disclosed in single and diverter types. In some cases, the valve blades are mounted on arms of differing radii to give a camming action as the valve blade closes, and incorporating self-closing seals for the sides of the blade and for the blade slot. A diverter valve employs curved blade surfaces in which the back of one blade acts as a diverter for the material flowing through the valve to deflect and direct the material into the adjacent outlet, free of areas on which the material may hang up or accumulate.

---

This invention relates to gate valves and more particularly to improvements in blade-type gate valves for controlling the flow of dry particulate material.

In my Patent 2,806,489 issued Sept. 17, 1957, there is described and claimed a gate valve in which an arcuate or cylindrical blade moves between the walls of a generally rectangular housing to control the flow of dry particulate material. The inventions which are described and claimed herein constitute improvements in valves of the type shown in this patent.

It is an important object of this invention to provide a gate valve in which the gate or moving blade has a positive closing action with cooperating fixed members of the valve housing or body. In the preferred embodiment, this is accomplished by causing the blade to have a cam-action so that the blade moves into positive closing or sealing engagement with portions of the valve housing in the closed position.

It is accordingly a further important object of this invention to provide a valve, as outlined above, in which an arcuate or cylindrical blade is carried on arms for pivotal movement, and in which the blade is caused to move along a path which differs slightly from that defined by the curvature of the blade, for the purpose of moving the blade in a radial sense as it moves on its pivots into positive cam-like sealing engagement with fixed cooperating members within the valve housing.

A further object of this invention is the provision of a gate valve for controlling the flow of dry flowable material in which the moving parts of the valve are effectively sealed by suitable flexible self-cleaning sealing members. This is particularly important where the valve is used under conditions in which the flow of finely divided material, such as sand and the like, is to be controlled, substantially reducing waste and eliminating explosive dust conditions.

A further object of this invention is to provide a two-way gate or diverter valve, as outlined above, in which the flow may be directed selectively, into either one of two selectable conduits.

These and further objects and advantages of the present invention will become apparent from the following description, the accompanying drawings and the appended claims.

In the drawings:

FIG. 1 is a perspective view of one embodiment of a valve constructed according to this invention;

FIG. 2 is a vertical section through the valve of FIG. 1 showing the valve in the open position;

FIG. 3 is a vertical section similar to FIG. 2, but showing the valve in the closed position;

FIG. 3A is a detail of a modified form of cam insert;

FIG. 4 is an enlarged and somewhat exaggerated view of the cam action of the blade of the valve of FIGS. 1–3;

FIG. 5 is a top plan view of the valve of FIG. 1;

FIG. 6 is an enlarged fragmentary section taken generally along the line 6—6 of FIG. 5 showing the wiper seal arrangement for the blade slot;

FIG. 7 is a further enlarged fragmentary section taken generally along the line 7—7 of FIG. 5 showing the valve blade and cam plate in the closed position of the valve;

FIG. 7A is a section similar to FIG. 7, but showing a modified form of a wiper seal along the side edges of the blade;

FIG. 8 is an enlarged fragmentary vertical section showing an impact seal for the front or leading edge of the blade;

FIG. 9 is a vertical elevation, partially broken away, showing a two-way diverter valve constructed according to this invention.

Figure 9A:
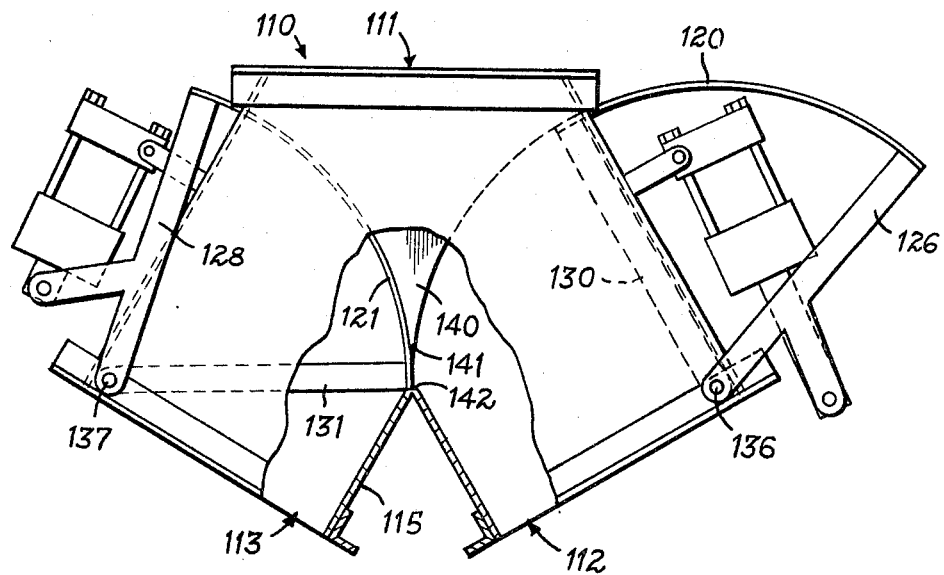
FIG. 9A is a view similar to FIG. 9 showing a two-way diverter valve in which the blades are independently actuated.

Referring to the figures of the drawing which illustrate preferred embodiments of the invention, a valve 10 is shown in FIG. 1 as being formed with a generally rectangular sheet metal housing 12. The housing 12 is formed with four walls, there being a front side wall 13 and a rear wall 14 and opposite side walls 15 and 16. The upper end of the valve 10 may be formed with a peripheral flange 18 to provide a suitable means for attachment to a conduit, such as for example the bottom of a bin or hopper or the like, the material of which is to be controlled by the valve. The bottom of the valve 10 may be similarly flanged as indicated at 19, for the purpose of attachment to a suitable container, conduit or the like.

The housing 12 accordingly defines an inlet 20 at the top of the valve and an outlet 21 at the bottom, as shown in FIG. 2. A transverse blade slot 22 is formed in the back wall 14 substantially across the width thereof and receives the flow control blade 25. The blade 25 is also preferably formed of sheet metal and is rolled or otherwise suitably formed into a true arc or portion of a cylinder. The blade 25 is received through the slot 22 with the concavity of the blade facing downwardly, and is proportioned with a width so as to be easily movable between the dimensions of the side walls 15 and 16.

The blade 25 is movable between an open position, as shown in FIG. 2 in which it provides generally unrestricted movement or flow of material from the inlet 20 to the outlet 21, to a closed position as shown in FIG. 3. In the closed position the blade 25 extends transversely of the housing 12 and curves downwardly therein from the blade slot 22 to a contact or impact point 26 on the inside surface of the forward or front wall 13.

The blade 25 is preferably supported for pivotal movement on two pairs of arms, such as the pair of spaced apart inner arms 28, one of which is shown in FIGS. 2 and 3. The upper ends of the arms 28 are connected to the forward edge of the blade 25, while the lower arm ends are pivotally mounted to the housing 12 by means of pins 30 which support or form bearings for the blade 25. The pins or bearings 30 may consist of self-aligning roller or ball bearings in valves where heavy loads of material are to be controlled, or where long life and minimum friction are important. In smaller valves, a single pin 30 may extend across the width of the housing 12 and may support nylon or bronze bushings, so that the blade 25 moves with the arms 28 with a minimum of pivotal resistance.

The pivot points formed at 30 are positioned adjacent the bottom of the housing 12 and inwardly or within the dimensions of the housing.

The inner arms 28 may advantageously be formed of a single U-shaped steel or sheet metal strap, or may be formed separately. Preferably, the arms 28 have an effective radial length which is substantially equal to the radius of curvature of the cylinder blade 25, and are spaced inwardly a short distance from the housing walls forming a clearance so that the arms do not bind with granular material during the opening and the closing movement of the valve.

Further support for the blade 25 includes a pair of outer arms 33 and 34. The outer arms are similarly mounted on the pins or bearings 30 which form a common pivot means for each of the arm pairs. However, the outer arms 33 and 34 have a greater spaced apart width than the width of the housing 12 so that the bottom portion of the arms 33 and 34 are received over the exterior of the housing, and receive support on a raised rib 35 forming a part of the bottom flange 19. The upper, inwardly-turned ends 36 of the outer arms 33 and 34 are suitably secured in supporting relation to opposite edges of the blade 25 at the blade portion which extends exteriorly of the valve through the slot 22. Accordingly, the blade 25 is guided for movement at its forward end in the housing and at its rearward end outside the housing by the inner and outer pairs of arms between the open and closed positions, respectively, as shown in FIG. 2.

The invention includes means for effecting offset, eccentric, or cam-like movement of the blade 25 generally in the manner shown in exaggerated form in FIG. 5. It has been found that movement of the blade 25 slightly upwardly during closing movement of the blade may advantageously be employed to effect a tight sealing of the blade with respect to the housing in the closed position. For this purpose, a pair of cam plates or inserts 40 and 41 are employed on the inner surfaces of the respective side walls 15 and 16 and have upper edges which may advantageously terminate at the mounting surfaces of the flange 18. The lower edges 42 of the cam plates 40 and 41 are formed to fit the curved contour of the blade 25 in the closed position. The cam plate inserts 40 and 41 may be substantially identical except being formed in left and right pairs with lower curved edges or surfaces 42 which closely approximate the upper surface of the blade 25 in the closed position. The cam plates 40 and 41 may be formed of the same material as the housing 12, such as sheet metal, but also may be formed of softer material, such as rubber, leather compoistion, and the like. When they are formed of such softer material, they provide for compensation for inaccuracies in alignment with the blade 25 or variations of curvature or irregularities on the blade. To provide for precise alignment, the cam plates 40 and 41 may be slotted as shown at 43 in FIG. 3A to provide for slight vertical alignment in the closed position of the valve. When the slotted cam plates are used, they may be retained by suitable bolts, rather than welded in place as in the case of the cam plates shown in FIGS. 1–3. Vertical alignment or adjustment is also helpful where hard granular material is being handled to adjust for a clearance which does not permit hard grains to be wedged between the blade and the cam plate edges 42 which may otherwise cause the blade to bind.

The invention further includes means mounting the blade 25 so that it moves in a somewhat eccentric and cam-like relation to the pivot bearings 30 during the opening and closing movement thereof, so that the blade moves upwardly in closing, into closing engagement with the cam plates 40 and 41 as shown by the full lines in FIG. 4. Conversely, the blade 25 moves downwardly away from the cam plates during opening, as shown by the broken lines in FIG. 4. This camming movement need not be as extensive as shown in somewhat exaggerated form in FIG. 4, and it has been found that a very slight eccentric movement is effective to provide good sealing in the closed position of the valve.

The camming movement may be conveniently effected by increasing the radius of the pivotal support at the rear of the blade, such as by slightly lengthening the effective length of the arms 33 and 34. All of the blade supporting arms may conveniently be made at the same length, which length is equal to the radius of the curved blade 25. Pieces of stock forming shims 46 may then be inserted, in assembly, between the curved or transverse upper ends 36 of the arms 33 and 34 and the adjacent lower surfaces of the blade 25, and suitably secured in place, as by welding. This results in effectively increasing the radius arm at the rear or outer end of the blade 25, as compared to the radius arm of the support at the front of the blade. As an example, shim stock having a thickness of 1/16 of an inch has been found to be satisfactory for this purpose, which could vary according to the size of the valve and the material being handled.

The cam-like action which is effected thereby results in a slight displacement of the true center of curvature of the blade 25, as shown at 48 in FIG. 4. However, the center of curvature preferably remains within the dimensions of the housing throughout the range of movement of the blade 25, and the pivot bearings 30 are, at all times, fixed within the dimensions of the housing. The cam-like action brings the blade 25 into full-line sealing contact with the cooperating surfaces 42 of the cam plates 40 and 41 at the opposite sides of the valve, forming an effective seal when the valve is closed. As soon as the blade starts to open, it runs freely. Due to the fact that the engaging surfaces 42 of the plates open downwardly, and due to the fact that the blade curves downwardly toward the front wall 13 during closing, there is a minimum tendency of material to become jammed or wedged between the blade and the surfaces 42 of the cam plates, and the valve is accordingly inherently self-cleaning. The blade 25 runs with the material, and uses very little more power to open and close than when there is no material above the blade. When closed, the blade may be easily opened even with a head of material above it due to the blade curvature, the fact that all the loads are carried on bearing points, and there are no flat sliding surfaces or guides against which the material can bind or cause friction.

Since the design and arrangement of parts is such that the valve is inherently self-closing once the closing movement has begun, the valve may be operated by hand as shown in my Patent No. 2,806,489. A suitable power or motor source which may advantageously be employed in a dust atmosphere is a two-way air cylinder 50 which has its upper end pivotally mounted at 52 to the rear wall 14. The piston rod 55 is pivotally connected to operate the outer arms 33 and 34 through a transverse operating rod 56 which is connected to the arms 33 and 34 through integral rearwardly and downwardly extending integral arm portions 58. The pivot point formed at the connection between the piston rod 55 and the connecting rod 56 is relatively close to the pivot point of the blade 25 thereby resulting in a relatively short stroke and a comparatively high speed action in opening and closing the valve. This is possible while still using a reasonably small air cylinder 50 due to the comparative ease by which the valve may be opened and closed even when loaded with material from above. As shown, the drive is applied effectively to the center of the blade, and therefore the opening and closing forces on the blade remain centered.

The invention preferably includes blade wiper seals at the blade slot 22 in the form of an upper blade wiper seal 60 and a lower blade wiper seal 62, as shown in FIG. 6. The upper seal 60 is of particular advantage whenever the valve is used with finely divided material, to prevent seepage or leakage through the blade slot 22.

The upper blade wiper seal 60 may consist of a transverse strip of flexible material which has its forward edge turned inwardly toward the interior of the housing in stripping or wiping contact with the upper surface of the blade 25. The seal 60 may be retained by a suitable retainer strap 63 along the upper edge thereof against the inside surface of the rear wall 14. Materials which may be used for the top wiper strip include stainless steel, vinyl, Teflon, neoprene, silicone rubber and the like. Preferably, the upper wiper seal is formed with a sharp or well defined forward edge 65 which engages the blade 25 at the top surface to effect a scraping or cleaning action with respect to the blade.

A lower wiper seal 62 may also be employed, as shown in FIG. 6, interiorly of the housing on the rear wall 14 and secured by a strap 68. However, an external seal may also be used. The seal 62 has a lip 63 which extends outwardly through the blade slot 22 into wiping engagement with the lower surface of the blade 25. The rear wall 14 provides support for the seal against rolling or curling when the valve is closed. The lower wiper seal 62 forms a dust seal with the blade 25 when the valve is closed, and may be advantageously used where the valve operates into a closed bin, where there may be considerable turbulence in the air during the time that the bin is being filled and particularly at the time the valve is closed and prevents blow-out and escape of finely divided particles through the blade slot 22 at the bottom of the blade 25. The seal 62 may be formed of flexible material similar to the seal 60 and has a wiping action with the bottom surface of the blade.

FIG. 7A shows an alternate arrangement of a gate seal for use with the side walls, and may be used in lieu of closely fitting cam plates 40 and 41. Here, a flexible seal 70 is retained by an arcuately formed plate 72, and the seal has an inwardly turned edge which engages the upper surface of the blade 25 along each of the side walls 15 and 16. The cam action is preferably employed so that the blade, as it closes, cams or moves upwardly into positive or sealing engagement with each of the side sealing strips 70, substantially in the manner described in connection with the cam plates 40 and 41 in FIG. 4. The seal 70 may be formed of Teflon, neoprene, vinyl, silicone rubber or the like, according to the type of material to be handled by the valve.

Although the forward end of the blade 25 forms a reasonably good seal at 26 with the inside surface of the front wall 13, an impact sealing strip 80 (FIG. 8) may be used where desirable to increase the effectiveness of the seal when the valve is closed.

The valve which has been described above is effective for controlling the flow of a wide variety of materials, from finely divided grain, flour and sand up to and including gravel, coal and the like. The valve is inherently self-cleaning in operation, and moves easily between the open and closed positions. Due to the downward curvature of the blade 25 in the closed position, the valve tends to be self-closing when loaded. As the blade moves toward the closed position, the weight of the material falling on the top surface of the blade assists the same to move rapidly completely into the closed and sealing position. The cam action of the blade due to the fact that the rear outer arms are effectively longer than the inner front arms causes the same to be moved into cam-like positive engagement with the cam plates 40, 41 or the side strips 70 as the valve closes. Therefore, the valve forms an effective seal in the closed position.

A further embodiment of the invention is shown in FIG. 9 in which the valve is constructed with a pair of blades as a diverter or two-way valve in which a generally rectangular sheet metal housing 110 is formed with an inlet 111, and a pair of selectable downwardly diverging outlets 112 and 113. These outlets diverge outwardly from each other at an approximately 30° included angle defined by a V-shaped wedge or divider 115, which forms a closure wall for the end of the selectively operable blades 120 and 121. The blades are connected for unison movement by a pair of connecting straps, one being shown at 125 which connects the outer arms 126 of the right hand blade 120 with the outer arms 128 of the left hand blade 121.

Each of the blades preferably includes inner arms 130 and 131, and the inner and outer arms may be constructed substantially as described above in connection with the embodiments of FIGS. 1–4. Pivot points 136 and 137 may be provided for each of the blades 120 and 121 positioned inwardly of the dimensions of the respective outlet legs 112 and 113.

The blades 120 and 121 may be configured similarly to the blade 25, and each opens downwardly in relation to its respective outlet 112 and 113. However, opposite cam plates 140, which may be formed of the same material as described for the plates 40, are formed with opposite curved surfaces which conform to the outer curvature of each blade. The plates 140 each terminate at a point 141 which is spaced slightly above the apex 142 of the V-shaped divider 115. Also, the curvature of the blades and the length of each of the inner arms are such as to carry the respective blades slightly over-center in the closed position, as shown by the blade 121, so that the forward end of each blade is brought down into slightly overlapping engagement with the apex 142.

Since the blades 120 and 121 move, in effect, in overlapping paths at the point of closure, the cam plates 140 do not extend completely down to the closure point of the valve with the V-shaped insert 115. However, very little leakage occurs at this point due to the fact that any material which is flowing from the inlet 111 to one of the selectable outlets 112 and 113 is deflected by the curvature of the blade outwardly away from this region.

A single cylinder 150 may be mounted on one end wall of the valve housing 110, as described above in connection with the cylinder 50. In operation, the cylinder causes the diverter valve of FIG. 9 to close one outlet 112, 113 while opening the other by direct connection to the arms 128 and by connection through the straps 125 to the opposite outside arms 126. Blade wiper seals as described above in connection with FIGS. 6 and 7A may be used with the diverter valve of FIG. 9, to seal the blade slots and form edge seals with the side walls and blade top. If cam-action is desired, the outer arms 126 and 128 may be made effectively longer than the arms 130 and 131 as described in connection with FIG. 4 above.

The diverter valve of FIG. 9 has particular advantage over the common flapper type of valve in that the material which strikes the exposed curved surface of the closed blades 121 or 120 does so throughout the length of the blade and tends to be deflected off of the blade at varying angles between the front and rear edges of the blade. Therefore, there is no tendency for the abrasive wear to concentrate. Concentration of wear is a characteristic of flapper valves which use a pivoted flat deflector plate. Also, no material can hang up, as in a flapper valve, to prevent the valve from fully closing. Further, where desired, each of the plates 120 and 121 may be separately controlled by a piston motor substantially as described above in connection with the valve of FIGS. 1–8, and the connecting straps 125 eliminated. This construction is shown in FIG. 9A, in which like parts are identified by like reference numerals corresponding to those used in FIG. 9. However, the blades are mounted to turn about radii which do not define overlapping paths, so that both blades may be closed simultaneously against the apex 142 of the wedge or V-shaped insert 115.

It will therefore be seen that this invention provides effective gate valves which are positive in operation and which are effectively sealed. The valves are self-cleaning in operation and are constructed with a minimum of moving parts. Since the pivot point or pins 30 and 136, 137 of the valves are substantially on the arcuate center of the associated blades and since they are located within the axial dimensions of the housings, the blades are substantially balanced in any position, while all of the thrusts are sustained on the pivot pins.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A valve for controlling the flow of flowable dry particulate material comprising a valve housing which is generally rectangular in section having means forming an inlet and an outlet, means in one wall of said valve forming a transverse slot, a blade formed with a generally cylindrical curvature with the concavity thereof facing downwardly and extending through said slot and movable between the side walls of said housing between an open position providing generally unrestricted flow from said inlet to said outlet and a closed position in which said blade extends transversely of said housing and curves downwardly therein from said slot, a pair of inner arms received within said housing having upper ends connected to said blade and having lower ends pivotally mounted on said housing adjacent the bottom thereof and a pair of outer arms having upper ends connected to said blade exteriorly of said housing and having lower ends pivotally mounted on said housing, means on said housing side walls defining seals having a curvature conforming to the curvature of said blade in the closed position thereof, said outer arms having an effective length in relation to said inner arms to offset the movement of said blade so that said blade moves upwardly into sealing engagement with said sealing means as said blade moves through said slot from the open to the closed position thereof.

2. The valve of claim 1 wherein a wiper seal is mounted on said housing adjacent said slot and has a transverse edge in wiping and stripping engagement with an exposed surface of said blade.

3. The valve of claim 1 wherein said housing further includes an upper flexible blade seal extending inwardly into said housing from a region adjacent said slot having an edge in wiping engagement with the upper surface of said blade, and a lower flexible blade seal extending outwardly away from said housing from a region adjacent said slot and engaging said blade at the lower surface thereof with an edge in wiping engagement with said lower blade surface.

4. The valve of claim 1 wherein said seals on said side walls are cam plate inserts formed of material which is softer than the material of said blade.

5. The valve of claim 1 wherein said side wall seals each include a strip of elastomeric material having lower edges received in overlying relation to the top surface of said blade in the closed position thereof.

6. A valve for controlling the flow of flowable dry particulate material comprising a valve housing which is generally rectangular in section having means forming an inlet and an outlet, means in one end wall of said valve forming a transverse slot, a blade formed with a generally cylindrical curvature with the concavity thereof facing downwardly and extending through said slot and movable between the side walls of said housing between an open position providing generally unrestricted flow from said inlet to said outlet and a closed position in which said blade extends transversely of said housing and curves downwardly therein from said slot, a pair of inner arms received within said housing having upper ends connected to said blade and having lower ends pivotally mounted on said housing adjacent the bottom thereof, a pair of outer arms having upper ends connected to said blade exteriorly of said housing and having lower ends pivotally mounted on said housing at the pivot points of said first arms, means on said housing side walls defining seals having a curvature conforming to the curvature of said blade in the closed position thereof, and said outer arms having a length which exceeds that of said inner arms by an amount sufficient to offset the center of curvature of said blade so that said blade moves upwardly into sealing engagement with said sealing means as said blade moves through said slot from the open to the closed position thereof.

7. A valve for controlling the flow of flowable particulate material comprising a valve housing generally rectangular in cross section and having means forming an inlet at the top and an outlet at the bottom, means in one wall of said valve defining a slot extending substantially the width thereof, an arcuate valve blade in the form of a portion of a cylinder extending through said slot with the concavity thereof facing downwardly toward said discharge opening, means mounting said blade for movement thereof through said slot between an open position providing substantially unrestricted flow from said inlet to said outlet to a closed position in which said blade extends transversely of said housing, means supporting said blade including inner arms mounted for pivotal movement on said housing, outer arms supporting said blade outwardly of said slot and defining a common pivotal connection with said inner arms, said outer arms having an effective radial length which exceeds that of said inner arms for effecting eccentric cam-like movement of said blade between said inner and outer positions, and seal means on the side walls of said housing having means forming blade engaging surfaces which conform substantially to the curvature of said blade in said closed position.

8. A valve for controlling the flow of flowable particulate material comprising a sheet metal valve housing generally rectangular in cross section and having means forming an inlet at the top and an outlet at the bottom, means in one wall of said valve defining a slot extending substantially the width thereof, an arcuate rolled steel valve blade in the form of a portion of a cylinder extending through said slot with the concavity thereof facing downwardly toward said discharge opening, means mounting said blade for movement thereof through said slot between an open position providing substantially unrestricted flow from said inlet to said outlet to a closed position in which said blade extends transversely of said housing, the center of curvature of said blade being positioned within the limits of said housing adjacent the bottom thereof with movement between said open and closed positions, means peripherally supporting said blade including inner arms having a length corresponding substantially to the radius of curvature of said blade and being mounted for pivotal movement on said housing substantially on the center of curvature thereof, and means forming outer arms supporting said blade outwardly of said slot and defining a common pivotal connection with said inner arms, said outer arms having an effective radial length which exceeds that of said inner arms for effecting eccentric cam-like movement of said blade between said inner and outer positions, and seal means on the side walls of said housing having means forming blade engaging surfaces which conform substantially to the curvature of said blade in said closed position.

9. A valve for controlling the flow of flowable particulate material comprising a sheet metal housing generally rectangular in section forming a discharge passage therethrough, means in one end wall of said housing defining a transverse slot, an arcuate valve blade, means mounting said blade for movement through said slot between an open position permitting unrestricted flow of said material through said passage and a closed position in which said blade extends across said passage in closed relation thereto, and means sealing said blade at said slot including an upper wiper having a flexible portion extending across said blade adjacent said slot on said one end wall and extending transversely downwardly in overlying relation to said blade into the interior of said valve and terminating in means defining a transverse blade wiping edge bearing against the upper surface of said blade.

10. The valve of claim 9 further including flexible edge sealing strips defining a seal between said blade and the side walls of said valve including a seal retainer plate which has a lower surface conforming substantially to the curvature of said blade in the closed position thereof, and a flexible seal securely clamped between said retainer plate and the associated said side wall having a lower end extending in overlying relation to said blade along one edge thereof in the closed position thereof.

11. The valve of claim 9 further including sealing members for sealing the edges of said valve blade along the side walls of said valve including means defining inserts formed of material which is softer than that of said blade and positioned in said valve passage on said side walls above said blade in the closed position thereof and each having a lower surface which conforms substantially to the curvature of said blade in said closed position forming a mechanical seal therewith.

12. A valve for controlling the flow of flowable particulate material comprising a sheet metal housing generally rectangular in section forming a discharge passage therethrough, means in one end wall of said housing defining a transverse slot, an arcuate valve blade, means mounting said blade for movement through said slot between an open position permitting unrestricted flow of said material through said passage and a closed position in which said blade extends across said passage in closed relation thereto, means sealing said blade at said slot including an upper wiper having a flexible portion extending across said blade adjacent said slot on said one end wall and extending transversely inwardly in overlying relation to said blade into the interior of said valve and terminating in means defining a transverse plate wiping edge bearing against the upper surface of said blade, and a lower wiper positioned interiorly of said valve beneath said blade on said one wall having a flexible member extending outwardly from said one wall through said slot and bearing against the lower surface of said blade.

13. A diverter valve for controlling the flow of flowable particulate material and for directing said flow into one of two conduits comprising a generally rectangular sheet metal housing having an inlet and a pair of selectable downwardly diverging outlets adapted for connection to such conduits, means in said housing defining an apex region between said outlets, a pair of arcuate valve blades movable in said housing in generally opposed relation with the concavity of each of said blades facing downwardly toward one of said outlets, means mounting each of said blades for pivotal movement between an open position permitting unrestricted flow of material from said inlet to the associated said outlet to a closed position in which said blade overlies said associated outlet, and each of said blades in its closed position presenting an outer curved material-diverting surface extending from a point adjacent said housing inlet downwardly to said apex region free of material accumulating or stagnating areas for directing flow from said inlet to said adjacent outlet.

14. The diverter valve of claim 13 further comprising means connecting said blades for unison movement in which one of said blades is in its open position when the other of said blades is in its closed position.

15. The valve of claim 13 in which said mounting means for each of said blades including an inner pair of arms positioned inwardly of said housing and an outer pair of arms positioned outwardly of said housing, said inner and outer pairs of arms for each of said blades being connected at a common pivotal point.

16. The valve of claim 15 in which said blades are mounted for movement in arcuate paths which overlap adjacent said apex.

17. The diverter valve of claim 15 in which said blades are independently movable with respect to each other, and separate motor means connected to each blade for effecting said blade movement.

18. A valve for controlling the flow of flowable particulate material, comprising a housing generally rectangular in section forming an inlet at the top thereof, an outlet at the bottom thereof, and a discharge passage therethrough between said inlet and said outlet, means in one end wall of said housing defining a transverse slot, an arcuate valve blade, means mounting said blade for pivotal movement through said slot in an arcuate path between an outer position permitting flow of such material through said passage and an inner flow-blocking position in which said blade extends transversely across said passage, and a pair of blade seals in said housing mounted on the side walls thereof above said blade path and having generally inwardly turned flexible seal members proportioned to overlie said blade and to engage a transverse upper surface portion of said blade in the closed position thereof while conforming generally to the upper arcuate surface configuration of said blade for sealing said housing at said blade.

References Cited

UNITED STATES PATENTS

| | | | |
|---|---|---|---|
| 389,589 | 9/1888 | Metcalf | 137—609 |
| 1,028,134 | 6/1912 | Raymaker | 251—301 |
| 1,639,517 | 9/1927 | Lassen | 141—317 |
| 2,806,489 | 9/1957 | Armstrong | 251—301 |

M. CARY NELSON, *Primary Examiner.*

W. CLINE, *Assistant Examiner.*